United States Patent [19]

Metzger et al.

[11] Patent Number: 5,071,259
[45] Date of Patent: Dec. 10, 1991

[54] SENSOR FOR MEASURING THE PRESSURE AND TEMPERATURE OF TIRES

[75] Inventors: Kurt Metzger, Altenberg; Gerhard Hettich, Dietenhofen; Reiner Dörfler, Nüremberg, all of Fed. Rep. of Germany

[73] Assignee: Robert Bosch GmbH, Stuttgart, Fed. Rep. of Germany

[21] Appl. No.: 459,716
[22] PCT Filed: Mar. 9, 1989
[86] PCT No.: PCT/DE89/00151
§ 371 Date: Jan. 29, 1990
§ 102(e) Date: Jan. 29, 1990
[87] PCT Pub. No.: WO89/11402
PCT Pub. Date: Nov. 30, 1989

[30] Foreign Application Priority Data
May 28, 1988 [DE] Fed. Rep. of Germany ....... 3818207

[51] Int. Cl.⁵ .................. G01K 1/14; G01K 7/00; B60C 23/20; B60C 23/04
[52] U.S. Cl. .................. 374/143; 374/185; 374/183; 73/146; 73/146.5
[58] Field of Search ............... 374/142, 143, 185, 183; 73/146, 146.5

[56] References Cited

U.S. PATENT DOCUMENTS

| | | | |
|---|---|---|---|
| 3,807,226 | 4/1974 | Williams | 374/124 |
| 4,597,286 | 7/1986 | Aguglia | 73/146.5 |
| 4,703,650 | 11/1987 | Dosjoub et al. | 374/143 |
| 4,723,445 | 2/1988 | Ripley et al. | 374/143 |
| 4,891,973 | 1/1990 | Bollweber et al. | 374/143 |
| 4,893,110 | 1/1990 | Hebert | 73/146.5 |
| 4,918,423 | 4/1990 | Fukuyama et al. | 73/146.5 |

FOREIGN PATENT DOCUMENTS

87/00128 1/1987 World Int. Prop. O. .
87/03545 6/1987 World Int. Prop. O. .

Primary Examiner—William A. Cuchlinski, Jr.
Assistant Examiner—Diego F. F. Gutierrez
Attorney, Agent, or Firm—Michael J. Striker

[57] ABSTRACT

A sensor for determining the pressure and temperature of the air in a vehicle tire and comprising temperature sensor elements decoupled from the temperature of the wheel rim and coupled to the temperature of the tire air. The temperature sensor elements are arranged on an insulating foil which is stretched over one of the openings of a cover cap which is fastened at the sensor housing so as to be thermally insulated. The temperature sensor elements are connected with connecting leads of the electronic circuit of the sensor via conductor paths of the insulating foil.

8 Claims, 2 Drawing Sheets

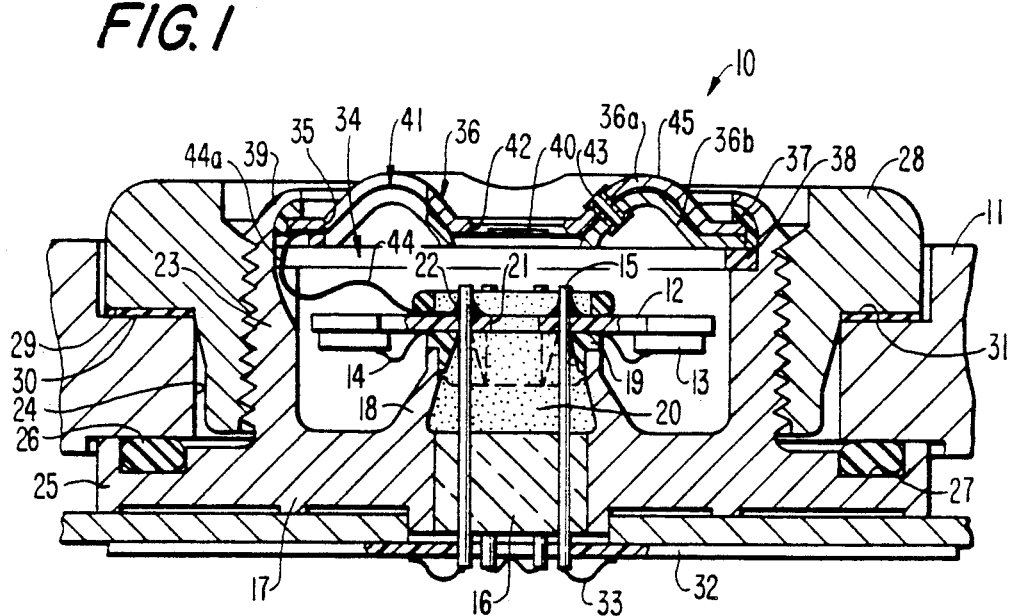
FIG. 1
FIG. 1b
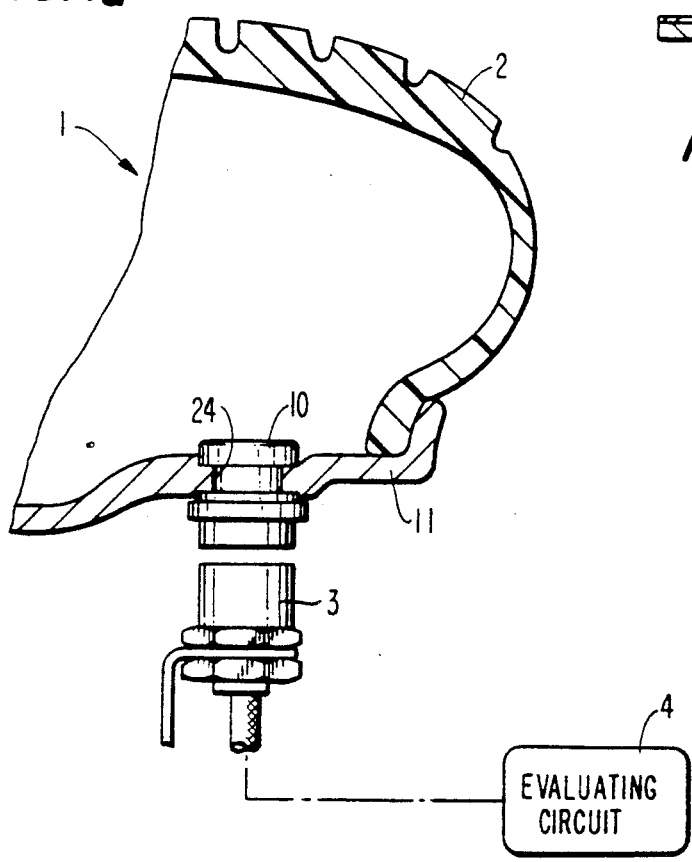
FIG. 1a

SENSOR FOR MEASURING THE PRESSURE AND TEMPERATURE OF TIRES

BACKGROUND OF THE INVENTION

The invention relates to a sensor for determining the pressure and temperature of the air in a vehicle tire and which comprises at least one pressure and temperature sensor element arranged in a front opening of a sensor housing communicating with a tire interior, and connected with an electrical circuit.

WO 87/035 45 discloses a diaphragm box carrying an electrical contact inserted in an insulating housing screwed in a threaded hole of a wheel rim. The diaphragm box is accordingly thermally decoupled from the wheel rim, so that it takes on the temperature of the tire air, and the reference pressure in the diaphragm box is not influenced by the rim temperature. In monitoring the tire pressure, a temperature-dependent change in the tire pressure is compensated for by a corresponding change in the reference pressure in the diaphragm box by coupling the latter with the temperature of the tire air, so that when the tire pressure is too low, the electrical contact triggers a switching process and, accordingly, a warning signal which is transmitted in a wireless manner from the revolving sensor to an evaluating circuit which is stationary with respect to the vehicle.

WO 87/001.28 discloses semiconductor sensors which measure the absolute air pressure in the tire and the temperature independently of one another, arranged on an insulating plate which is received in the center of a metallic sensor housing. The housing is to be inserted into a corresponding opening of the wheel rim. In so doing, the temperature of the rim is transmitted to the sensor housing and reaches the sensors partially because of heat conduction via the insulating plate and partially due to heat radiation. Since the temperature of the wheel rim can diverge considerably from the temperature in the tire because of the proximity of the brake, but also because of the head wind, falsified values can be determined because of this thermal coupling of the sensors with the wheel rim and can trigger a false alarm and, in critical cases, can even suppress a necessary warning.

SUMMARY OF THE INVENTION

The object of the invention is a temperature sensor having a good thermal coupling with the temperature of the tire air. The object of the invention is achieved by arranging at least one temperature sensor element on an insulating foil for monitoring the mass of the tire inflating gas and which is surrounded with tire air, and connecting the sensor element with the sensor circuit via conductor path of the foil, the sensor element being insulated from the sensor housing. The mass of the tire inflation gas present in the tire is monitored in that the tire pressure and the inflation gas temperature are continuously measured independently of one another. An advantage of the sensor according to the invention consists in that the thermal resistance of the temperature sensor for the tire inflation gas is smaller by several orders of magnitude than that for the rim with the sensor according to the invention. Accordingly, the sharp differences in temperature which can occur between the wheel rim and the tire air no longer lead to the falsification of the measurements, as was previously the case. Thus, it is possible to effect a correction of the measured value of the tire pressure from the exact temperature measurement with the electronic circuit in the sensor in such a way that the mass of the tire inflation gas is continuously monitored and a warning signal is triggered when the inflation of the tire is too low.

In order to communicate the tire air temperature with the temperature sensor, it is particularly advantageous if the foil with the temperature sensor is stretched over a perforation or a central opening on the inside of a cover cap which closes the housing opening toward the tire and at which a particularly favorable whirling of the tire air occurs during travel. In order to prevent damage to the foil with the temperature sensor when mounting or removing the tire, the foil is advisably clamped between two profiled sheet metal plates which form the protective cap and are provided with an outwardly curved toroid which encloses the central opening with the foil. In an advantageous manner, the foil itself can comprise a base foil with conductor paths and one or more temperature sensor elements, as well as a cover foil for protection against the tire atmosphere and against slight mechanical stresses.

The present invention both as to its construction so to its mode of operation, together with additional objects and advantages thereof, will be best understood from the following detailed description of the preferred embodiment when read in connection with the accompanying drawings.

BRIEF DESCRIPTION OF THE DRAWINGS

FIG. 1 shows an enlarged cross-sectional view of a sensor according to the invention, FIG. 1a shows an enlarged partial cross-sectional view of a vehicle wheel with a sensor according to the invention;

FIG. 1B is a view showing a structure of an insulating foil of the sensor in accordance with the present invention.

DESCRIPTION OF THE PREFERRED EMBODIMENT

Figure 2:
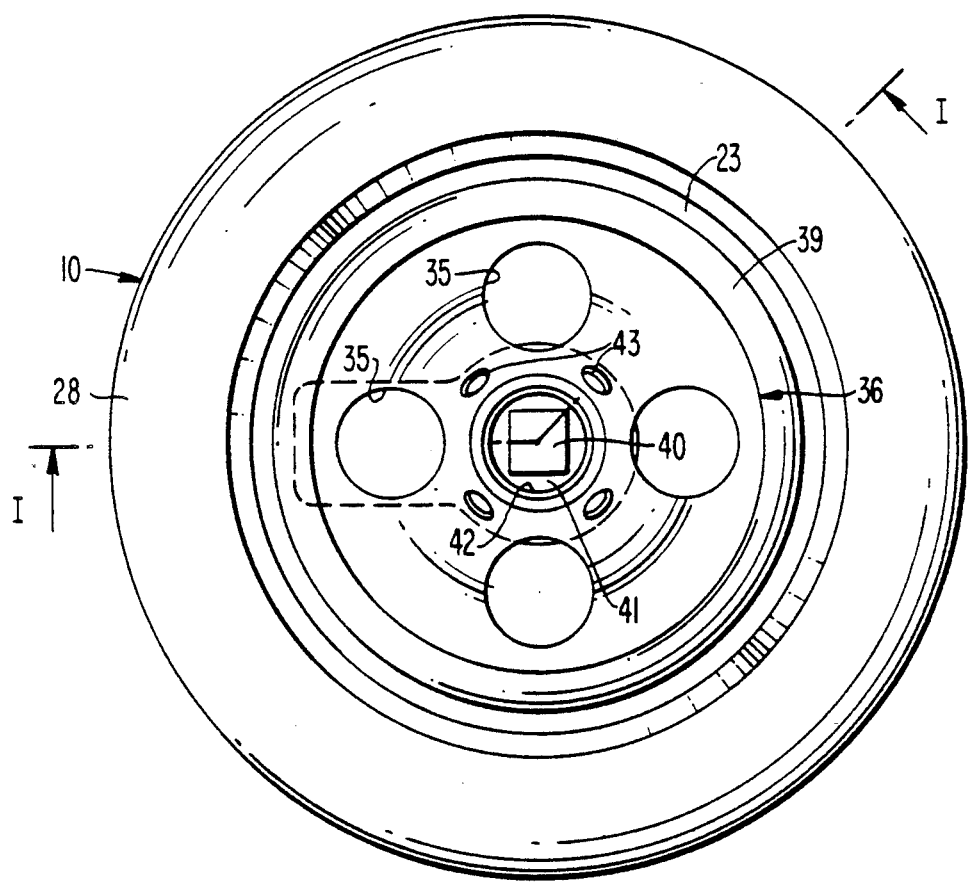
FIG. 2 shows an enlarged top view of the pressure sensor.

FIG. 1a shows a cross-section of a vehicle wheel 1 on an enlarged scale. The wheel has a tire 2 mounted on a wheel rim 11. The sensor 10 is arranged in an aperture 24 of the wheel rim 11 and particularly in its inwardly directed portion. A signal receiver 3 is mounted at a small distance in the region of the sensor 10 on a not shown wheel suspension of the vehicle. The end side of the signal receiver 3 is directed toward the sensor 10 and couples for enegy supply a high frequncy vibrations in the sensor 10 when the sensor runs near the signal receiver 3 during the rotation of the vehicle wheel 1. Morever, the measuring values from the sensor 10 are transmitted via the signal receiver 3 to an evaluating circuit 4 which is mounted on the vehicle and disclosed in U.S. patent application Ser. No. 221,464, incorporated herein by reference thereto. In order to measure the tire pressure, semiconductor sensors in the form of sensor elements 13 which work independently of one another and continuously measure the absolute pressure of the tire air are arranged in the outer area of an insulating plate 12 of the sensor 10 as shown in FIG. 1. The sensor elements 13 make contact with connecting leads 15 in the central area of the insulating plate with their connections 14 via conductor paths of the insulating plate 12, which connecting leads 15 are received in a pressure-tight glass bushing 16 in an aperture of the sensor housing 17. A collar 18 in the shape of a truncated cone is formed on at the base of the sensor housing 17 and carries the insulating plate 12 with a holder 19 in its central area at the upper end comprising the connecting leads 15. The hollow space between the bushing 16 and the collar 18 and the holder 19 is filled with a casting resin 20 which is poured in through a bore hole 21 in the center of the insulating plate 12 and also embeds the soldering joints 22 between the connecting leads 15 and conductor paths of the insulating plate 12. The metallic sensor housing 17 is provided with the threaded shoulder 23 which projects through a aperture 24 of the wheel rim 11 from the outside to the inside, wherein the sensor housing 17 contacts the outer rim side with an annular shoulder 25 via a sealing ring 26. The sealing ring 26 is guided in an annular groove 27 in the shoulder 25 of the sensor housing 17. A crown-shaped nut 28 which is tightened in the rim aperture 24 with an annular shoulder 29 via an insulating ring 30 is screwed onto the threaded shoulder 23 of the sensor housing 17 on the inside of the wheel rim 11. The insulating ring 30 is inserted in a shoulder 31 of the rim aperture 24 in order to thermally decouple the sensor housing 17 from the wheel rim 11. A plate 32 which carries an electronic circuit for generating and converting the sensor signals and makes contact with the ends of the connecting leads 15 projecting out of the bushing 16 via connections 33, is fastened at the outside of the sensor housing 17.

As can be seen from FIG. 1, the insulating plate 12 with the sensor elements 13 for the tire pressure is located in a housing opening 34 directed toward the interior of the tire, which housing opening 34 is closed toward the tire by a cover cap 36 provided with openings 35. The cover cap 36 is received on the outside in an insulating ring 37 which is supported on an annular shoulder 38 at the threaded shoulder 23 of the sensor housing 17, and is clamped at the latter with an annular flange 39. The insulating ring 37 decouples thermally the cover cap 36 from the sensor housing 17.

At least one temperature sensor element 40 is arranged on an insulating foil 41 for monitoring the mass of the inflation gas present in the tire, the insulating foil 41 being stretched over a central opening 42 of the cover cap 36. The sensor elements 40 for measuring the temperature are connected with the electronic circuit on the plate 32 of the sensor 10 via conductor paths of the foil 41 and connecting leads 15. The insulating foil 41 with the temperature sensor elements 40 is decoupled from the temperature of the sensor housing 17 as well as from the temperature of the wheel rim 11 by the insulating ring 37. The insulating foil 41 includes a base foil 41a, which supports the temperature sensor element 40 on its side facing the tire interior. The insulating foil further has a conductor path 40a and a cover foil 41b which covers the temperature sensor element 40, as shown in FIG. 1b.

It can be seen additionally from FIG. 1 that the insulating foil 41 is stretched between two profiled sheet metal plates 36a and 36b forming the cover cap 36. The sensor elements 40 for measuring the temperature are produced from thin-film resistors (nickel, platinum or the like) and make contact with the conductor paths of the insulating foil 41. In FIG. 2, a dashed line indicates that the insulating foil 41 is clamped between profiled sheet metal plates 36a and 36b with a plurality of rivet connections 43 arranged around the central opening 42.

A strip 44 of the insulating foil 41, which is guided away to the side and carries the conductor paths 44a for the connection of the temperature sensor elements 40, is fixed on the insulating plate 12 in its end area, according to FIG. 1, via the connecting leads 15. The central opening 42 of the profiled sheet metal plates 36a and 36b with the insulating foil 41, which is clamped therein and carries the temperature sensor elements 40, is enclosed by an outwardly curved toroid 45 of the cover cap 36, so that it is protected against mechanical damage when mounting or removing the tire. It can be seen from FIG. 2 that, e.g., four holes distributed at the circumference are arranged as openings 35 in the area of the toroid 45 of the cover cap 36 for a good whirling of air.

In order to protect the temperature sensor elements 40 against slight mechanical stresses and against the tire atmosphere, it is advisable that the insulating foil 41 comprises a base foil which carries the conductor paths and the thin-film resistors of the sensor elements 40 and is covered, in addition, with a cover foil toward the interior of the tire.

With the suggested arrangement of the temperature sensor elements, it is possible to measure the pressure p as well as the temperature T of the tire inflation gas with sufficient accuracy, so that the general gas equation is:

$$p \times V = m \times R \times T. \ (R = \text{gas constant})$$

Assuming a constant tire volume V, the mass m of the tire inflation gas is given by the equation $m = \text{const.} \times p/T$ in that, e.g., the electronic circuit on the plate 32 determines a value for the mass m of the tire inflation gas from the measured quantities of the temperature and pressure sensor elements 13 and 40 and transmits it to the evaluating circuit in the vehicle in a wireless manner. The value determined in the evaluating circuit is compared with a limiting value and an alarm is triggered when the limiting value is not reached. The transmitted value can likewise be displayed as a temperature-independent tire pressure.

With the sensor 10, according to the invention, for monitoring tire pressure a good thermal coupling with the tire inflation gas has been successfully found, on one hand, and a sufficiently robust mechanical construction, on the other hand, which also satisfies the complicated operating conditions and requirements of safety-related devices in motor vehicles.

While the invention has been illustrated and described as embodied in a sensor for measuring temperature and pressure in a vehicle tire, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sensor for determining pressure and temperature of air in a vehicle tire, said sensor comprising a housing to be secured in an aperture in a tire rim and having an opening communicating with a tire interior; a pressure sensor element within said housing; at least one temperature sensor element arranged in said opening; an insulating foil for monitoring a mass of a tire inflating gas, said insulating foil being arranged in said opening and being surrounded by the tire inflating gas, said at least one temperature sensor element being arranged on said insulating foil; and means for thermally insulating said insulating foil from said housing.

2. A sensor as set forth in claim 1, further comprising a cover cap for covering said opening of said housing and having a central opening through which said opening of said housing communicates with the tire interior, said insulating foil being stretched over said central opening.

3. A sensor as set forth in claim 2, further comprising an insulating plate located in said opening of said housing, said insulating foil being stretched on a side of said cover cap facing said insulating plate, said cover cap being clamped at a rim of said housing defining said opening, said thermally insulating means comprising an insulating ring for clamping said cover cap at said rim of said housing whereby said cover cap is insulated from a temperature of the tire rim.

4. A sensor as set forth in claim 3, wherein said at least one temperature sensor element comprises a thin-film resistor, said sensor comprising leads for connecting said thin-film resistor with an electrical circuit of said sensor, and said insulating foil comprising conductor paths for connecting said thin-film resistor with said connecting leads.

5. A sensor as set forth in claim 2, wherein said cover cap is formed by two profiled sheet metal plates, said insulating foil being clamped between said two profiled sheet metal plates.

6. A sensor as set forth in claim 5, wherein said two profiled sheet metal plates form an outwardly curved toroid enclosing said central opening.

7. A sensor as set forth in claim 5, further comprising a plurality of rivet means for clamping said insulating foil between said two profiled sheet metal plates.

8. A sensor as set forth in claim 1, wherein said insulating foil includes a base foil having a side facing the tire interior and conductor path arranged on said side, said at least one temperature sensor element being also arranged on said side, said insulating foil further including a cover foil for covering said at least one temperature sensor element.

* * * * *